US011125330B2

(12) United States Patent
Fages

(10) Patent No.: US 11,125,330 B2
(45) Date of Patent: Sep. 21, 2021

(54) BELLOWS

(71) Applicant: Ratier-Figeac SAS, Figeac (FR)

(72) Inventor: Christian Fages, Figeac (FR)

(73) Assignee: RATIER-FIGEAC SAS, Figeac (FR)

( * ) Notice: Subject to any disclaimer, the term of this patent is extended or adjusted under 35 U.S.C. 154(b) by 0 days.

(21) Appl. No.: 16/036,106

(22) Filed: Jul. 16, 2018

(65) Prior Publication Data
US 2019/0024794 A1 Jan. 24, 2019

(30) Foreign Application Priority Data

Jul. 19, 2017 (EP) ..................................... 17305960

(51) Int. Cl.
| *F16J 3/04* | (2006.01) |
| *B29C 64/106* | (2017.01) |
| *B33Y 10/00* | (2015.01) |
| *F16J 15/02* | (2006.01) |
| *B33Y 80/00* | (2015.01) |
| *G05G 25/04* | (2006.01) |
| *B29L 31/00* | (2006.01) |
| *B29L 9/00* | (2006.01) |
| *F16H 59/02* | (2006.01) |
| *G05G 9/047* | (2006.01) |

(52) U.S. Cl.
CPC .............. *F16J 3/041* (2013.01); *B29C 64/106* (2017.08); *B33Y 10/00* (2014.12); *B33Y 80/00* (2014.12); *F16J 3/042* (2013.01); *F16J 15/022* (2013.01); *G05G 25/04* (2013.01); *B29K 2995/007* (2013.01); *B29L 2009/00* (2013.01); *B29L 2031/703* (2013.01); *F16H 59/0213* (2013.01); *G05G 9/047* (2013.01)

(58) Field of Classification Search
CPC ........ F16J 3/00; F16J 3/04; F16J 3/041; F16J 3/043; F16J 15/022; F16J 15/52; B33Y 10/00; B33Y 80/00; B29C 64/106; G05G 25/04; B29K 2995/007; B29L 2009/00; B29L 2031/703
See application file for complete search history.

(56) References Cited

U.S. PATENT DOCUMENTS

| 4,237,998 | A | | 12/1980 | Matayoshi | |
| 4,535,207 | A | * | 8/1985 | Lindqvist | ................. B25J 13/02 200/17 R |
| 4,860,665 | A | * | 8/1989 | Schmidt | ................. B29C 71/04 105/18 |
| 7,513,507 | B2 | | 4/2009 | Sugiyama | |
| 8,025,297 | B2 | * | 9/2011 | Smith | ..................... F16L 27/11 277/635 |

(Continued)

FOREIGN PATENT DOCUMENTS

| DE | 102010034024 A1 | 2/2012 |
| DE | 102011102960 A1 | 11/2012 |
| DE | 102011107580 A1 | 1/2013 |

OTHER PUBLICATIONS

Extended European Search Report for International Application No. 17305960.1 dated Jan. 31, 2018, 9 pages.

*Primary Examiner* — Gilbert Y Lee
(74) *Attorney, Agent, or Firm* — Cantor Colburn LLP

(57) ABSTRACT

A bellows comprises a unitary bellows body extending from a first end to a second end in an axial direction. The stiffness of the bellows body varies in at least an axial direction.

20 Claims, 2 Drawing Sheets

(56) References Cited

U.S. PATENT DOCUMENTS

| | | | |
|---|---|---|---|
| 2005/0189727 A1* | 9/2005 | Smith | F25B 9/145 |
| | | | 277/634 |
| 2013/0115834 A1 | 5/2013 | Stone et al. | |
| 2015/0291724 A1* | 10/2015 | Kusano | C09D 175/06 |
| | | | 524/591 |
| 2017/0100886 A1 | 4/2017 | Durant et al. | |
| 2019/0315908 A1* | 10/2019 | Hioki | C08G 64/02 |

* cited by examiner

BELLOWS

FOREIGN PRIORITY

This application claims priority to European Patent Application No. 17305960.1 filed Jul. 19, 2017, the entire contents of which is incorporated herein by reference.

TECHNICAL FIELD

The present disclosure relates to bellows and in particular, but not exclusively, to bellows which may be used in sidesticks, joysticks, pistons or other control elements.

BACKGROUND

It is typical in control elements such as joysticks and sidesticks to provide a flexible bellows element over the control element to prevent ingress of contaminants into the control element mechanism. The bellows is typically made from a flexible elastomeric material to accommodate movement of the control element. The bellows is typically attached at one end to a control element housing and at another end to the control element. Due to the nature of the bellows material, it may prove difficult to effect such attachments in a simple manner. Moreover, the material may not allow for controlled deformation of the bellows.

SUMMARY

From a first aspect, the present disclosure provides a bellows comprising a unitary bellows body made from a polymeric material made from polymeric material, the bellows body having a varying stiffness.

In embodiments, the variation in stiffness may be obtained by a variation in the hardness of the material of the bellows body and/or a variation in the wall thickness of the bellows body.

In embodiments, the bellows body may extend from a first end to a second end in an axial direction. The stiffness of the material of the bellows body may vary in an axial direction, a lateral direction or circumferentially around the bellows body.

The bellows may comprise a mounting portion arranged at the first end of the bellows body. The mounting portion may have a stiffness which is greater than the stiffness of an axial section of the bellows body between the first and second ends thereof.

The mounting portion may comprise a mounting flange.

The bellows may further comprise a second mounting portion arranged at the second end of the bellows body. The second mounting portion may have a stiffness which is greater than the stiffness of an axial section of the bellows body between the first and second ends thereof.

The second mounting portion may comprise a sleeve.

In embodiments, the mounting portion and/or the second mounting portion may comprise fastener openings for receiving fasteners.

In embodiments, the hardness of the mounting portion and/or second mounting portion may be Shore 70 or greater.

In various embodiments, the stiffness of the bellows material may decrease from the first end in a direction towards the second end of the bellows body.

In various embodiments, outwardly convex portions of corrugations of the bellows body may have a higher stiffness than outwardly concave portions of the corrugations.

The hardness of the material of the bellows body may also vary in an axial direction.

In various embodiments, the bellows body is additively manufactured.

The bellows body may be elastomeric, for example comprising synthetic based rubber material.

The disclosure also provides an assembly comprising a control element, a control element housing and a bellows in accordance with the disclosure mounted at one end to the control housing and at the other end to the control element.

The disclosure also provides a method of manufacturing a polymeric bellows body a polymeric bellows body having a variable stiffness, the method comprising depositing bellows body material in successive layers in an additive manufacturing process, the hardness and/or wall thickness of the deposited material varying to provide the requisite variation in stiffness.

A particular hardness of the material deposited may be achieved by co-deposition of materials having different hardnesses, the proportion of the materials deposited at any location determining the hardness of the material at that location.

The additive manufacturing process may be a photopolymerisation process.

BRIEF DESCRIPTION OF DRAWINGS

An embodiment of this disclosure will now be described, by way of example only, with reference to the accompanying drawings, in which.

DETAILED DESCRIPTION

Figure 1:
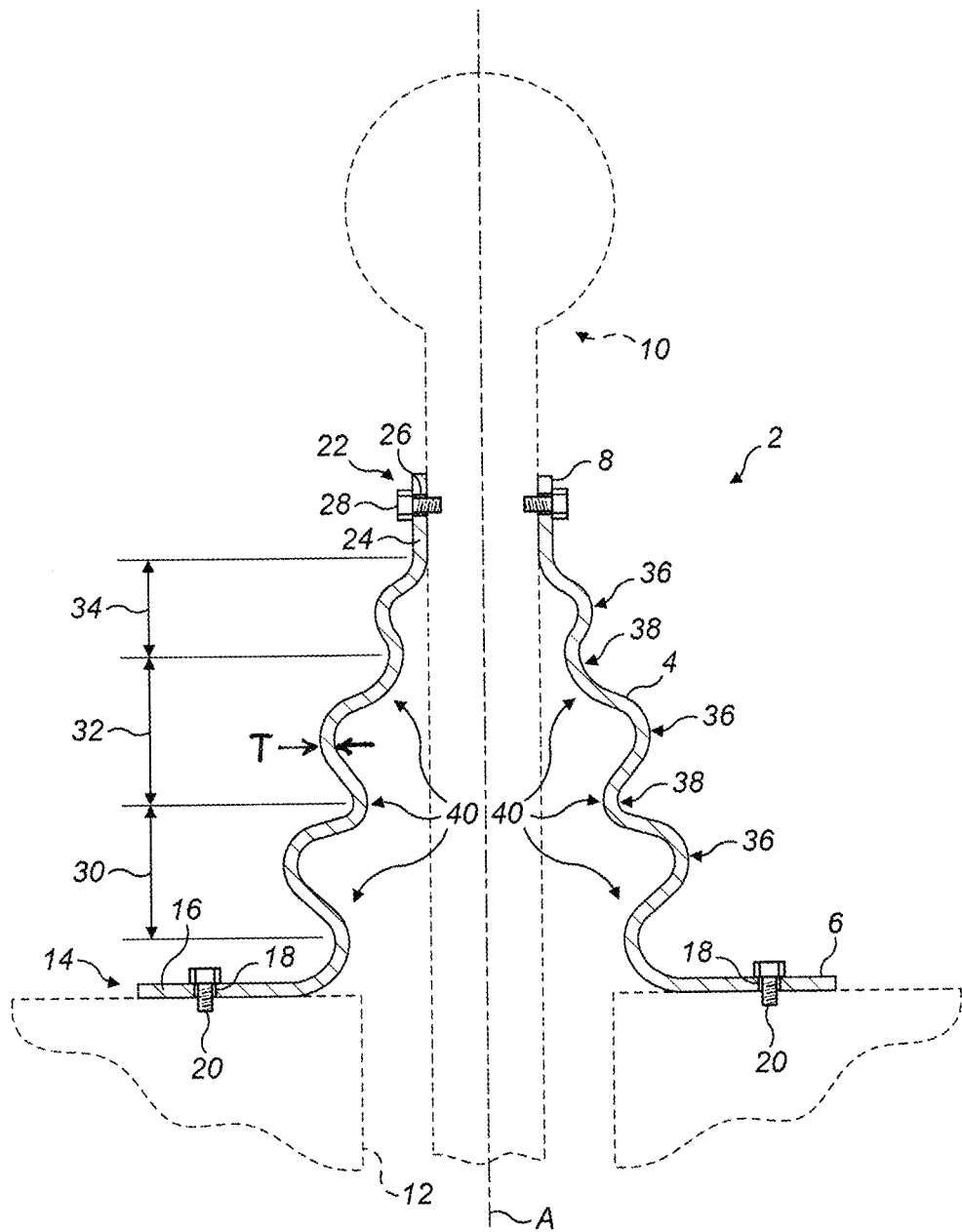
FIG. 1 illustrates schematically, a vertical section through a bellows in accordance with an embodiment of the disclosure.

With reference to FIG. 1, a bellows 2 comprises a bellows body 4 which extends axially from a first end 6 to a second end 8 along a longitudinal axis A. The bellows body 4 is a unitary, one-piece component advantageously made, as will be described further below, from a flexible polymeric material by an additive manufacturing process.

In embodiments, the bellows body 4 may be made from an elastomeric material, such as a synthetic rubber-based material.

The bellows 2 receives a control element 10, in this example a joystick or sidestick 10 which extends into a control element housing 12. The joystick or sidestick 10 is suitably supported in the housing 12 by means well known in the art. The bellows 2 prevents ingress of material into the housing 12.

The bellows body 2 comprises a first mounting portion 14 at its first end 6 for mounting the bellows 2 to the housing 12. The first mounting portion 10 comprises a mounting flange 16 which comprises plurality of openings 18 for receiving fasteners 20, for example screws, nuts or other threaded fasteners.

The bellows body 2 further comprises a second mounting portion 22 at its second end 8 for attaching mounting the bellows 2 to the joystick 10. The second mounting portion 22 comprises a mounting sleeve 24 which surrounds an upper part of the joystick 10. The mounting sleeve 24 comprises one or more openings 26 for receiving fasteners 28, for example screws, nuts or other threaded fasteners.

The bellows body 2 in this embodiment tapers, i.e. decreases in cross-sectional area, from its first end 6 to its second end 8. However, in other embodiments, the bellows body 4 may be generally cylindrical in shape.

Intermediate the first and second mounting portions 14, 22, the bellows body 4 comprises a plurality of corrugations 40 and comprises a plurality of intermediate sections, illustrated schematically as sections 30, 32, and 34. In this embodiment, three such sections are illustrated, although there may be more or fewer intermediate sections.

In accordance with the present disclosure, the stiffness, i.e. the modulus of elasticity, of the bellows body 4 varies. The variation in stiffness may be along the axial direction, in a lateral direction (i.e. in a direction perpendicular to the axial direction, or circumferentially (i.e. around the axial direction). In certain embodiments, the stiffness may vary in more than one or in all of these directions In certain embodiments, the variation in the stiffness of the bellows body 4 can be achieved by varying the hardness of the material of the bellows body 4. Generally, a material with a higher hardness will have a higher stiffness. Thus by locally modifying the hardness of the material of the bellows material, the desired local stiffness can be obtained. As will be described further below, the use of an additive manufacturing process facilitates the modification of the properties of the bellows material.

In other embodiments, the variation of stiffness may be achieved by varying the thickness T of the bellows body 4.

In yet further embodiments, the variation in stiffness may be achieved by varying both the hardness and the thickness of the bellows body 4.

In order to facilitate mounting of the bellows 2 to the housing 12, in embodiments of the disclosure, the first mounting portion 14 may be relatively stiff and may be made from a relatively hard material. For example, the first mounting portion 14 may have a hardness of Shore 70 or higher. This will provide sufficient stiffness and strength for the fasteners 20 to attach the bellows 2 to the housing 12. It may also reduce the deformation of the bellows body 4 adjacent the housing 12, thereby reducing the likelihood of the bellows body 4 being deformed into the housing 12 and interfering with the movement of the joystick 10.

Similarly, the second mounting portion 22 may also be made from a relatively stiff, for example a relatively hard material. Again it too may have a hardness of Shore 70 or higher.

In certain embodiments of the disclosure, the stiffness of the bellows body 4 and in embodiments the hardness of the bellows material may generally decrease from the first mounting portion 14 towards the second mounting portion 22. For example, in the disclosed embodiment, the stiffness (and in embodiments the hardness) of the intermediate sections 30, 32, 34 may decrease in a generally stepwise manner. In one embodiment, the hardness of first intermediate section 30 adjacent the mounting section 14 may be Shore 60, the hardness of the second section 32 adjacent the first intermediate section 14 may be Shore 40 and the hardness of third intermediate section 3 adjacent the second intermediate section 32 may be Shore 30. In other embodiments, however, there may be a continuous rather than stepwise variation in stiffness.

In other embodiments, the stiffness of the bellows body 4 and therefore in certain embodiments the hardness of the bellows material may vary in a cyclic manner from the first mounting portion 14 to the second mounting portion 22. For example, in one embodiment, the outwardly convex portions 38 of the bellows corrugations may have a higher stiffness (and hardness) than the stiffness and hardness of the outwardly concave portions 38 of the corrugations. This may be advantageous in that it may assist in maintaining the external shape of the bellows during deformation, the deformation occurring preferentially in the less stiff, softer outwardly concave portions 38 of the bellows corrugations.

Of course the stiffness and in embodiments the hardness of the various bellows body sections, the number of different bellows body sections and their configuration may be chosen to provide the desired deformation characteristics for the bellows body 4.

As discussed above, the bellows 2 is advantageously manufactured using an additive manufacturing technique.

A wide variety of additive manufacturing processes are known and any such process which allows the deposition of two or more polymeric materials may be used to manufacture the bellows 2.

Figure 2:
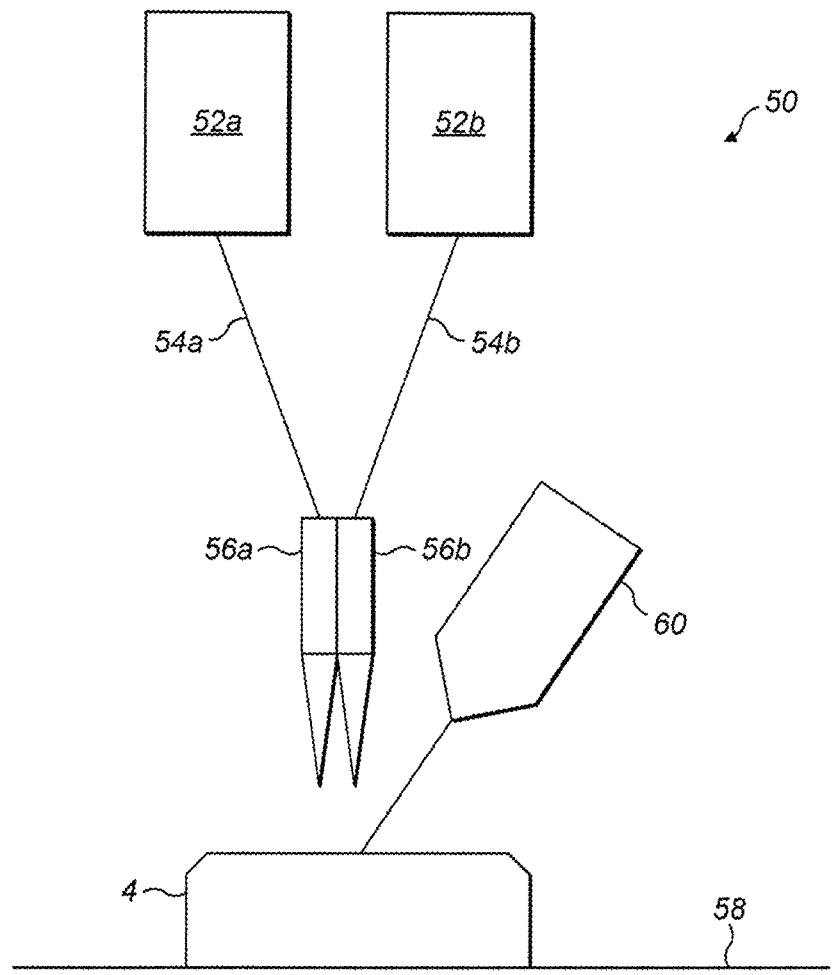
FIG. 2 illustrates, schematically, an apparatus for manufacturing the bellows.

One technique which may be particularly suitable is that of photopolymerisation. This technique is illustrated in FIG. 2, which shows, schematically, a photopolymerisation apparatus 50.

The photopolymerisation apparatus 50 comprises supply sources 52a, 52b for respective photo-curable polymeric materials. The polymeric materials are fed to respective deposition nozzles 54a, 54b via supply lines 56a, 56b. The nozzles 54a, 54b, deposit the polymeric materials onto a bed 58 and the deposited material is cured by a UV or other source 60. The bed 58 and/or nozzles 54a, 54b are moved such that the materials are deposited and cured in the appropriate positions. The workpiece, in this case the bellows body 4, is built up layer by layer.

There are a number of commercially available machines of this type, for example PolyJet 3D Printers produced by Stratasys Limited. No further details need therefore be provided of the process or apparatus.

The desired hardness (and thus stiffness) of the bellows body 4 is obtained by co-depositing the polymeric materials in a desired proportion. Thus the local hardness and therefore stiffness of the bellows body 4 can be obtained by choosing the appropriate proportion of polymeric materials to be co-deposited in the desired position. Thus, supply 52a may contain a relatively hard material and supply 52b may contain a relatively soft material, the desired hardness being obtained by the relative proportions of the materials deposited at any one point. Of course, the materials chosen should be compatible and stable when mixed in this way.

The respective materials are laid down and cured in an appropriate pattern in a layer by layer manner to produce the shape of the bellows body 4.

It will be appreciated that the embodiment above is merely exemplary of the disclosure and that modifications may be made to it within the scope of the disclosure. For example, whilst the stiffness of the bellows body 4 has been disclosed as decreasing in a direction from the first end 6 to the second end 8, the stiffness of the bellows body 4 may vary in another manner, for example cyclically as described. The stiffness and e.g. hardness of the various sections of the bellows body 4 may be chosen to provide the desired deformation and/or mountability of the bellows body 4.

Also, rather than mixing different materials to achieve the desired hardness of the bellows body 4 at any particular location, only one material having the desired hardness may be deposited at the location. This may, however, require the use of more materials.

Also, while the above embodiments disclose obtaining a variation in the bellows stiffness by varying the hardness of the bellows material, the requisite variation in hardness may, in certain embodiments be achieved by alternatively or additionally varying the thickness of the wall of the bellows body 4.

Also, while the embodiment has been described in the context of a control element, the bellows may be used in other applications, for example around a piston or other linearly movable element.

By varying the stiffness of the bellows body 4, in embodiments, the deformation of the bellows body 4 may be controlled, for example to avoid unwanted interference of the bellows body 4 with the movement of the joystick 10. The bellows 2 may be load neutral on a joystick 10 and this may be achieved by suitably tailoring the stiffness profile. It also means that, for example, deformation of the bellows body 4 adjacent the housing 12 may be controlled to avoid any interference between the bellows body 4, the housing 12 and the joystick 10.

The invention claimed is:

1. A joystick bellows comprising a unitary bellows body made from polymeric material, the bellows body having a varying stiffness obtained by a variation in the hardness of the polymeric material of the bellows body, wherein the bellows body extends from a first end to a second end in an axial direction, and the stiffness and hardness of the bellows body decreases in the axial direction from the first end to the second end of the bellows body.

2. A joystick bellows as claimed in claim 1, wherein the variation in stiffness is further obtained by a variation in the wall thickness of the bellows body.

3. A joystick bellows as claimed in claim 1, wherein the stiffness of the bellows body varies in a lateral direction or circumferentially around the bellows body.

4. A joystick bellows as claimed in claim 3, wherein the mounting portion comprise fastener openings for receiving fasteners.

5. A joystick bellows as claimed in claim 3, wherein the hardness of the mounting portion is Shore 70 or greater.

6. A joystick bellows as claimed in claim 1, comprising a mounting portion arranged at the first end of the bellows body, wherein the mounting portion has a stiffness which is greater than the stiffness of an axial section of the bellows body between the first and second ends thereof, the mounting portion optionally comprising a mounting flange.

7. A joystick bellows as claimed in claim 1, comprising a second mounting portion arranged at the second end of the bellows body, wherein the second mounting portion has a stiffness which is greater than the stiffness of an axial section of the bellows body between the first and second ends thereof.

8. A joystick bellows as claimed in claim 7, wherein the second mounting portion comprises a sleeve.

9. A joystick bellows as claimed in claim 1, wherein outwardly convex portions of corrugations of the bellows body have a higher stiffness than outwardly concave portions of the corrugations.

10. A joystick bellows as claimed in claim 1, wherein the bellows body is additively manufactured.

11. A bellows as claimed in claim 1, wherein the bellows body tapers from the first end to the second end.

12. A bellows as claimed in claim 1, wherein the bellows body comprises co-deposited polymeric materials having different hardnesses, the proportion of the polymeric materials at any location determining the hardness of the polymeric material of the bellows body at that location.

13. A bellows as claimed in claim 1, wherein the stiffness and hardness of the bellows body decrease continuously in the axial direction from the first end to the second end of the bellows body.

14. An assembly comprising:
a control element comprising a joystick;
a control element housing; and
a joystick bellows as claimed in claim 1 mounted at one end to the control housing and at the other end to the control element.

15. A method of manufacturing a polymeric bellows body for a joystick, the bellows body having a variable stiffness, the method comprising:
depositing bellows body polymeric material in successive layers in an additive manufacturing process, the hardness of the deposited bellows body polymeric material varying to provide the variable stiffness, comprising depositing the bellows body polymeric material such that the bellows body extends from a first end to a second end in an axial direction, and the stiffness and hardness of the bellows body decreases in an axial direction from the first end to the second end of the bellows body.

16. A method as claimed in claim 15, wherein a desired hardness of the bellows body polymeric material deposited is achieved by co-deposition of polymeric materials having different hardnesses, the proportion of the polymeric materials deposited at any location determining the hardness of the bellows body polymeric material at that location.

17. A method as claimed in claim 15, wherein the additive manufacturing process is a photopolymerisation process.

18. A method as claimed in claim 15, wherein the variable stiffness is further provided by a varying wall thickness of the deposited bellows body polymeric material.

19. A method as claimed in claim 15, further comprising depositing the bellows body polymeric material such that the bellows body tapers from the first end to the second end of the bellows body.

20. A method as claimed in claim 15, wherein the stiffness and hardness of the bellows body decrease continuously in the axial direction from the first end to the second end of the bellows body.

* * * * *